United States Patent
Echols, Jr. et al.

(10) Patent No.: US 7,085,550 B1
(45) Date of Patent: Aug. 1, 2006

(54) METHOD AND APPARATUS FOR OPTIMIZING RADIO FREQUENCY (RF) COVERAGE IN A RADIO COMMUNICATION NETWORK

(75) Inventors: Billy G. Echols, Jr., Jackson, MS (US); Jay Matthew Dominick, Madison, MS (US)

(73) Assignee: MCI, LLC, Basking Ridge, NJ (US)

( * ) Notice: Subject to any disclaimer, the term of this patent is extended or adjusted under 35 U.S.C. 154(b) by 1098 days.

(21) Appl. No.: 09/809,533

(22) Filed: Mar. 15, 2001

(51) Int. Cl.
*H04Q 7/20* (2006.01)

(52) U.S. Cl. .................. 455/403; 455/404.2; 455/457; 455/566

(58) Field of Classification Search .............. 455/424, 455/446, 453, 9, 67.11, 115.2, 226.1, 226.2, 455/115.3, 404.2, 414.1, 414.2, 457, 566
See application file for complete search history.

(56) References Cited

U.S. PATENT DOCUMENTS

| | | | | |
|---|---|---|---|---|
| 5,212,684 A | * | 5/1993 | MacNamee et al. | 370/280 |
| 5,697,064 A | * | 12/1997 | Okamoto et al. | 455/507 |
| 5,765,112 A | * | 6/1998 | Fitzgerald et al. | 455/509 |
| 5,878,369 A | * | 3/1999 | Rudow et al. | 701/215 |
| 5,995,836 A | * | 11/1999 | Wijk et al. | 455/436 |
| 6,205,335 B1 | * | 3/2001 | Furusawa et al. | 455/436 |
| 6,298,233 B1 | * | 10/2001 | Souissi et al. | 455/423 |
| 6,370,356 B1 | * | 4/2002 | Duplessis et al. | 455/63.3 |
| 6,445,924 B1 | * | 9/2002 | Rasanen | 455/437 |
| 6,522,888 B1 | * | 2/2003 | Garceran et al. | 455/456.3 |
| 6,591,100 B1 | * | 7/2003 | Dent | 455/434 |

\* cited by examiner

*Primary Examiner*—Congvan Tran (57) ABSTRACT

A radio communication network includes a plurality of base station receivers coupled to a switch for communication with at least one mobile station. A network monitoring device queries the switch for data related to the radio coverage provided by the communication network and, in response, the switch sends the data to the monitoring device. A report is generated that is related to the data received by the switch. The report indicates areas of the communication network providing deficient or redundant radio coverage in the communication network.

26 Claims, 5 Drawing Sheets

| BrID | MSA/GRID | Site Name | Total | Unique | #oflinks | brd_/_lnk_/_mi_/_angle_1 | brd_/_lnk_/_mi_/_angle_2 |
|---|---|---|---|---|---|---|---|
| 60349 | 106/11 | WHJT | 4907.57 | 221 | 12 | 60390/0.909/ 5.7/121 | 55106/0.770/ 8.9/111 |
| 60594 | 106/13 | CASTLEWOODS | 2831.57 | 205.71 | 12 | 18106/0.715/ 8.7/264 | 53106/0.689/ 9.9/263 |
| 60381 | 106/14 | BYRAM TOWER | 6857.86 | 481.86 | 12 | 60390/0.870/10.7/14 | 55106/0.776/11.9/31 |
| 60603 | 106/15 | BRANDON WATER TOWER | 2873.14 | 359.86 | 12 | 60390/0.758/14.8/275 | 55106/0.719/11.3/276 |
| 18106 | 106/18 | MISSISSIPPI ETV | 27368.29 | 1694 | 12 | 53106/0.768/ 1.3/257 | 60717/0.559/ 5.9/0 |
| 58106 | 106/2 | ONE JACKSON PLACE | 15131.43 | 257.29 | 12 | 55106/0.929/ 0.6/181 | 60390/0.863/ 3.5/264 |
| 53106 | 106/3 | ST DOMINIC HLTH SVC | 26170.57 | 1199.29 | 12 | 18106/0.803/ 1.3/77 | 60717/0.544/ 6.3/12 |
| 55106 | 106/5 | COMNET TOWER | 18648.71 | 557.57 | 12 | 60390/0.851/ 3.4/274 | 58106/0.754/ 0.6/1 |
| 60717 | 106/5720 | CENTURY TOWER | 21161.29 | 3396 | 12 | 18106/0.723/ 5.9/180 | 53106/0.672/ 6.3/192 |
| 60991 | 106/5835 | ALPHA ONE JXMMS | 6640.71 | 2414 | 12 | 60390/0.968/ 3.0/71 | 55106/0.843/ 6.4/63 |
| 56106 | 106/6 | AIRPORT | 4900.71 | 59.71 | 12 | 60390/0.829/10.0/263 | 18106/0.810/ 4.4/295 |
| 57106 | 106/8 | SRITE TOWER | 1924.29 | 564.14 | 12 | 60717/0.637/ 4.7/210 | 18106/0.520/10.3/194 |
| 60390 | 106/9 | CITY TOWER | 25287.43 | 2973.71 | 12 | 55106/0.627/ 3.4/94 | 53106/0.551/ 5.3/60 |

METHOD AND APPARATUS FOR OPTIMIZING RADIO FREQUENCY (RF) COVERAGE IN A RADIO COMMUNICATION NETWORK

BACKGROUND OF THE INVENTION

1. Field of the Invention

This invention relates generally to radio communication networks and, more particularly, to a method and apparatus for optimizing radio frequency (RF) coverage in a radio communication network.

2. Description of the Related Art

Radio communication networks, such as cellular telephone networks, have become increasingly popular over the years due in part to the freedom of movement they provide to the communicating public. As a result of this popularity, radio communication networks have rapidly expanded into several new coverage areas, thereby increasing the range of their radio coverage to the mobile user.

Radio communication networks are dynamic in a sense that the physical surroundings, in which these networks are deployed, are constantly changing. That is, new construction, such as office building construction, within areas of the radio communication network may cause the range of reception for some base transceivers to be decreased, in which case, additional base transceivers may need to be added to the network to provide adequate coverage.

Typically, the radio communication provider will deploy individuals to test certain areas of the communication network to determine which areas are deficient in radio coverage. However, such testing by the radio communication provider has proven to be quite costly. Furthermore, due to the radio communication network's rapid expansion over the years to satisfy consumer demand, it has become increasingly difficult for such radio coverage field testing to be effective for the entire coverage area of the network.

The present invention is directed to overcoming, or at least reducing the effects of, one or more of the problems set forth above.

SUMMARY OF THE INVENTION

One aspect of the present invention is seen in a method for optimizing radio frequency coverage in a radio communication network. The radio communication network includes a plurality of base station receivers coupled to a switch for communication with at least one mobile station. The method includes querying the switch for data related to the radio coverage provided by the communication network and sending the data to a monitoring device. A report is generated that is related to the data received by the switch. The report indicates areas of the communication network providing deficient or redundant radio coverage in the communication network.

Another aspect of the present invention is seen in a system. The system includes a plurality of base station receivers that receives transmissions via radio with at least one mobile station. A switch couples the base station receivers. A monitoring device queries the switch for data related to the radio coverage provided by the base station receivers and generates a report related to the data received by the switch. The report indicates areas of the system providing deficient or redundant radio coverage by the base station receivers.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
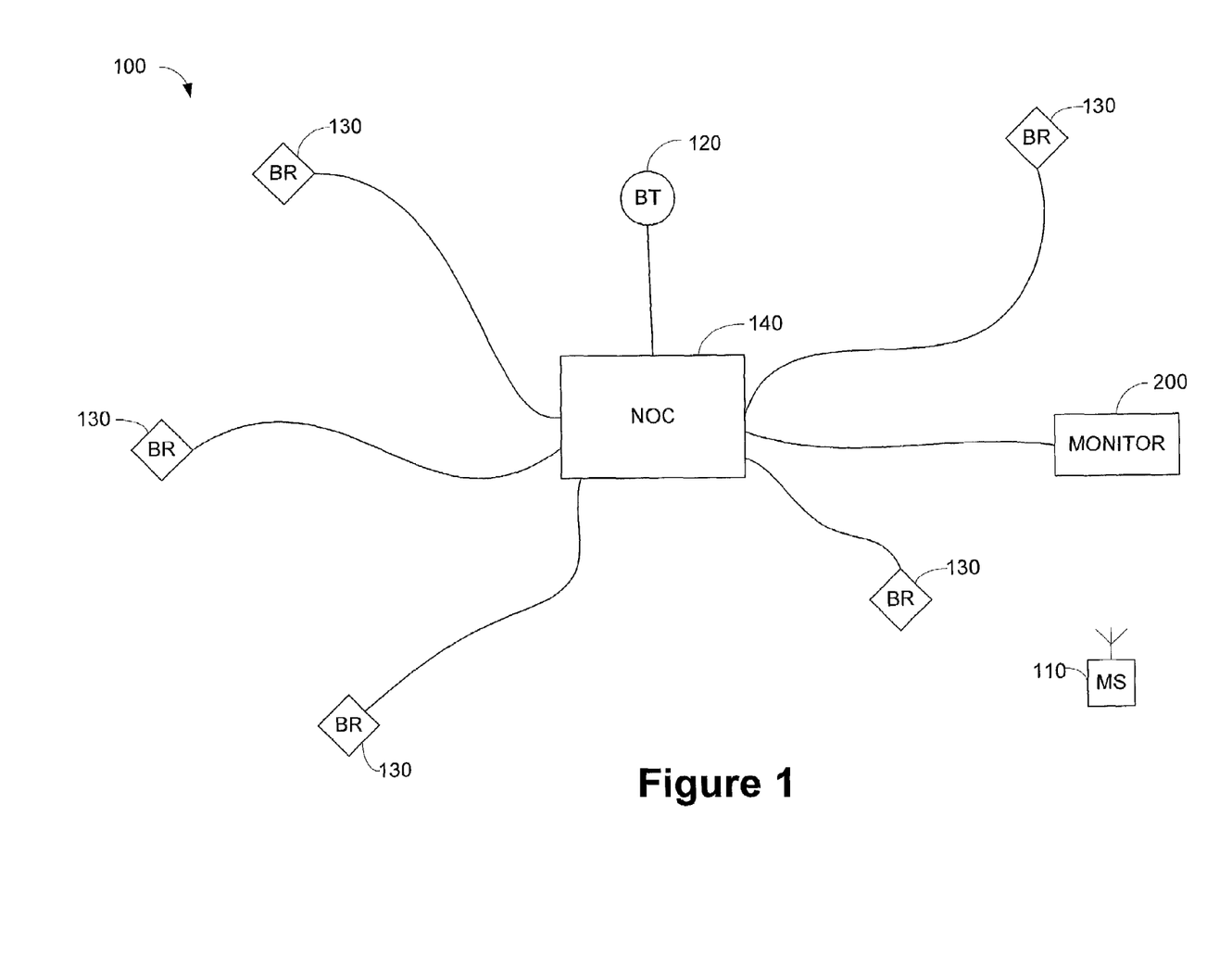
FIG. 1 shows a radio communication network in a accordance with one embodiment of the present invention.

Turning now to the drawings, and specifically referring to FIG. 1, a radio communication network 100 is shown. According to one embodiment of the present invention, the radio communication network 100 can take the form of an analog or digital cellular telephone network. It will be appreciated, however, that the radio communication network 100 may alternatively take the form of a PCS network, two-way paging network, or various other types of zoned radio communication networks.

The radio communication network 100 includes at least one mobile station (MS) 110 that receives radio communication on a forward path from at least one base transmitter (BT) 120. The mobile station 110 also transmits radio communication in the form of messages over a reverse path for reception by at least one of a plurality of base station receivers (BR) 130, which are deployed in various geographical locations throughout the network 100 to provide continuous coverage to the mobile station 110. In accordance with the illustrated embodiment, the radio communication network 100 is a macrodiversity network where there are approximately 5 to 7 base receivers 130 deployed for every base transmitter 120. Of course, it will be appreciated that the number of base receivers 130 associated with a particular base transmitter 120 may vary, and, thus, need not be limited to the aforementioned example.

The base transmitter 120 and the base receivers 130 are coupled to a network operation center (NOC) 140, which switches connections between the mobile station 110 and the various base transmitters 120 and the base receivers 130 as the mobile station 110 traverses the radio communication network 100. The switching of the mobile station 110 to the various base transmitters 120 and receivers 130 may be accomplished via conventional handoff techniques as is well established in the art. The NOC 140 also maintains connections with other NOCs (not shown) within the network 100 that may be handling radio communication for another mobile station (not shown) that is in communication with the mobile station 110. It will further be appreciated that the NOC 140 may also be coupled to the public switched telephone network (PSTN) (not shown) to permit communication between the mobile station 110 and a landline telephone network.

As previously mentioned, the radio communication network 100 is provided in a macrodiversity configuration where the power levels of the forward and reverse links to and from the mobile station 110 are unbalanced. That is, the transmission power on the forward link from the base transmitter 120 to the mobile station 110 is greater than the transmission power on the reverse link from the mobile station 110 to the base receiver 130. As a result of this disparity in transmission power, there are a plurality of base receivers 130 deployed for every base transmitter 120 in the network 100. Because of this macrodiversity configuration, when the mobile station 110 transmits over the reverse path, its transmission is typically received by more than one base receiver 130. When the same message transmitted over the reverse path is received by more than one base receiver 130, the message is considered to be a "shared" message. This shared message between the base receivers 130 indicates a cross-linking or coupling between those base receivers 130 that received the same message from the mobile station 110. If the transmission sent from the mobile station 120 over the reverse path is received by only one base receiver 130, then the transmission is considered to be a "unique" message. When a particular base receiver 130 receives several unique messages, it is typically undesirable since the network 100 may not be able to error correct any corrupted transmissions from the mobile station 110 when the transmission is received by only one base receiver 130. On the other hand, when a base receiver 130 shares a substantial number of messages with other base receivers 130, and has a small number of unique messages, such coverage is redundant and may indicate an inefficient use of network resources. Additionally, as the physical surroundings in which the radio communication network 100 is deployed changes over time, adding new base receivers 130 or relocating or removing existing base receivers 130 from the radio communication network 100 may be desirable to optimize radio communication coverage.

Figure 2:
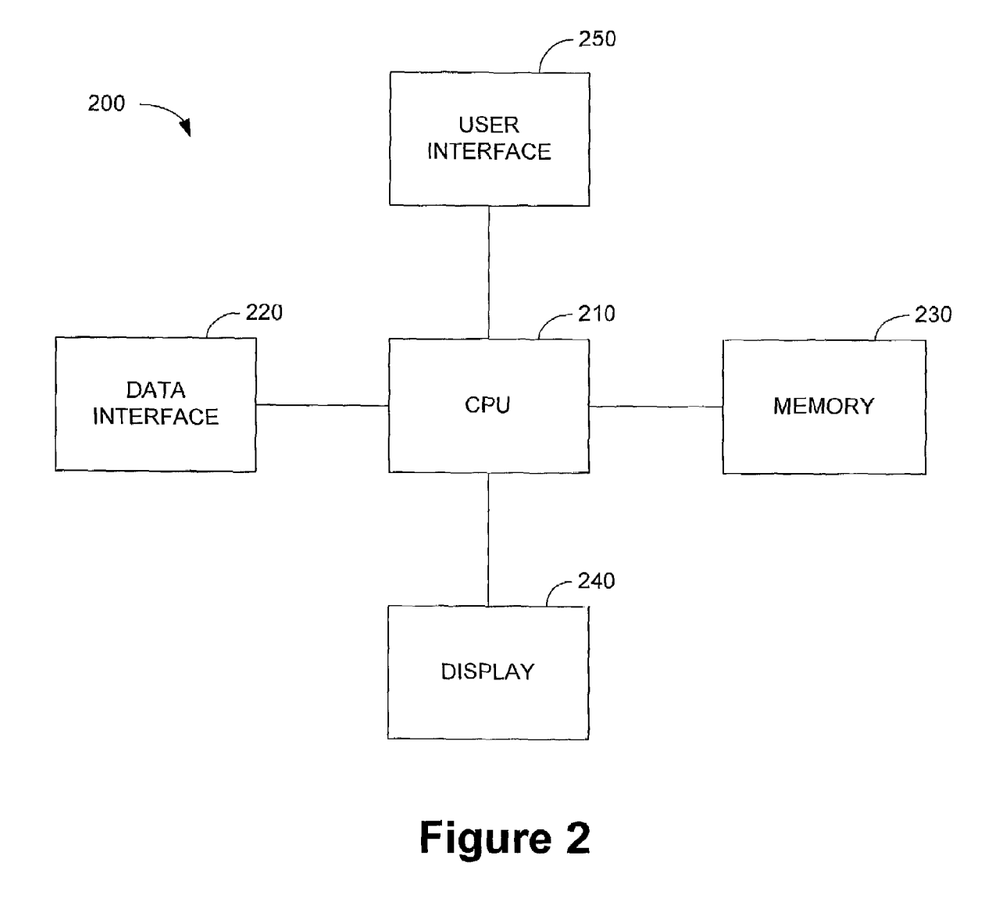
FIG. 2 provides a simplified block diagram of a network monitoring system used to monitor and optimize the radio coverage provided by the communication network of FIG. 1.

Turning now to FIG. 2, a network monitoring system 200 is shown for monitoring the radio coverage of the communication network 100. In accordance with one embodiment of the present invention, the network monitoring system 200 is located remotely from the NOC 140; however, it will be appreciated that the system 200 may be an integral part of the NOC 140 without departing from the spirit and scope of the present invention.

According to the illustrated embodiment, the network monitoring system 200 comprises a central processing unit (CPU) 210 for controlling the overall operation of the system 200 and for processing data related to the radio coverage provided by the communication network 100. A data interface 220 is coupled to the CPU 210 for extracting the network data provided by the NOC 140. Also coupled to the CPU 210 is a memory 230, which stores the network data received from the NOC 140 and also stores an analysis of the network data that is performed by the CPU 210. The system 200 further includes a display 240 for visually conveying the network data and analysis thereof in the form of a report to a network operator. A user interface 250 is further provided for permitting interaction between the system 200 and a network operator.

According to one embodiment of the present invention, the network monitoring system 200 takes the form of a personal computer available from a variety of manufacturers, such as Compaq Computer Corporation, for example. In one embodiment, the user interface 250 may be embodied as a keyboard, a mouse, touchpad or the like. It will also be appreciated that the user interface 250 may include any combination of the aforementioned devices. For example, the user interface 250 may include a keyboard and a mouse for use by the network operator. Additionally, the display 240 may take the form of a touchscreen to permit user interaction with the system 200 by a network operator.

According to one embodiment of the present invention, the network monitoring system 200 can be used to determine areas of the radio communication network 100 that need additional base receivers 130 deployed where radio coverage is deemed deficient or areas where there may be too many base receivers 130 deployed, thus providing redundant coverage. The network monitoring system 200 identifies such areas of the radio communication network 100 that provide a sufficient amount, an insufficient amount or over-redundant radio communication coverage, and, accordingly, allows for optimizing radio communication coverage by the network operator.

In accordance with the illustrated embodiment, the network monitoring system 200 requests the NOC 140 to determine the total number of reverse path messages received for each base receiver 130 that is coupled to the NOC 140 within a specified period of time. According to one embodiment, the specified period of time consists of a 168-hour period (i.e., a seven day period). It will be appreciated, however, that the specified period of time may vary, and, thus, need not be limited to the aforementioned example. The network monitoring system 200 also requests the NOC 140 to determine the number of unique reverse path messages that were received by a particular base receiver 130 within the specified period of time. As previously discussed, a "unique" reverse path message is a message that is received by only one base receiver 130 and is not received by any other base receiver 130 in the network 100. The network monitoring system 200 also requests the NOC 140 to determine the number of reverse path messages that are shared between each base receiver 130 and all other base receivers 130 coupled to the NOC 140 over the specified period of time. The network monitoring system 200, subsequent to receiving this data from the NOC 140, calculates a percentage of cross-linkage between a particular base receiver 130 and all other base receivers 130 coupled to the NOC 140. Such percentage calculation will be further understood as the detailed description proceeds.

Figure 3:
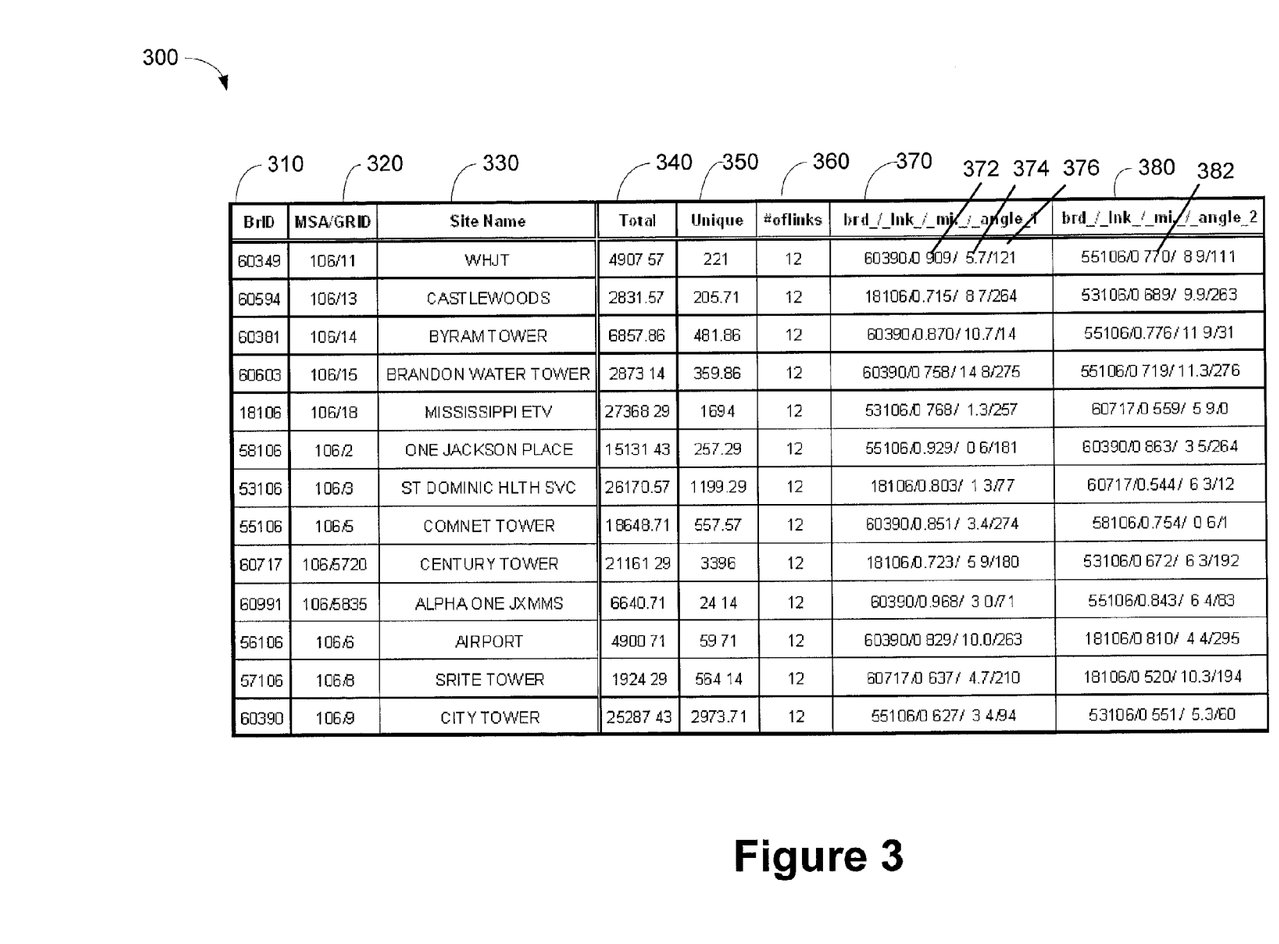
FIG. 3 is an example of a report generated by the network monitoring system of FIG. 2 in spreadsheet format.

Turning now to FIG. 3, an example of a report 300, which is generated by the CPU 210 of the network monitoring system 200 and is displayed on the display 240, is shown. In accordance with one embodiment, the report 300 may be provided in the form of a spreadsheet such as Microsoft Excel available from Microsoft Corporation, for example. The report 300 includes a base receiver identification (ID) column 310 that uniquely identifies each of the base receivers 130 that are coupled to the NOC 140 of the network 100. Each base receiver ID 310 has associated therewith an MSA/GRID field 320 that identifies the geographical location of a particular base receiver 130 on a map, and a corresponding site name 330 that is given to the particular base receiver 130.

The total number of messages that were received for each base receiver 130 over a specified period of time is provided in column 340 of the report 300. According to one embodiment, the NOC 140 is instructed by the network monitoring system 200 to determine the number of messages received for each base receiver 130 over the specified period of time, which is a 168-hour period in the illustrated embodiment. The network monitoring system 200 then divides the total number of messages for the 168-hour period to provide a total number of messages per day for each base receiver 130 in column 340 of the report 300.

According to the illustrated embodiment, the network monitoring system 200 also determines the number of unique messages that were received by the particular base receiver 130 on a per day basis and provides this information in column 350 of the report 300. As previously described, these unique messages are received only by the one base receiver 130.

The network monitoring system 200 provides the total number of links that a particular base receiver 130 shared with other base receivers within the network 100 in column 360 of the report 300. For example, if one base receiver 130 had at least one shared message with twelve other base receivers 130 within the network 100, then the number of links that particular base receiver 130 had established is twelve. For each base receiver 130 that a particular base receiver 130 had shared at least one message, the network monitoring system 200 determines the percentage of shared messages with that particular base receiver 130 and provides this information in column 370. Specifically, the percentage of shared messages between one base receiver 130 and another is determined by dividing the number of shared messages with that receiver and the total number of messages received (as indicated in column 340).

Referring to the specific example provided for in FIG. 3, base receiver ID 60349 shared approximately 91% of its total messages received with base receiver ID 60390 as indicated by field 372. Column 370 also provides the number of miles that separate the geographical position of base receiver ID 60349 and 60390 (i.e., 5.7 miles in the example provided as indicated by field 374) and the angle (0–360 degrees) from which base receiver ID 60390 is oriented with respect to base receiver ID 60349 as indicated by field 376. The same information that is provided in column 370 is also provided in column 380 but for a different base receiver 130. In the example provided, column 380 provides the percentage of shared messages that base receiver ID 60349 had with base receiver ID 55106, which is approximately 77% of base receiver ID 60349's messages were shared with base receiver ID 55106 (as indicated by field 382). Column 380 further indicates that base receiver ID 55106 is located 8.9 miles at an angle of 111 degrees from base receiver ID 60349. According to one embodiment, the distance and angle of orientation separating the various base receivers 130 from each other may be obtained from the memory 230 in the network monitoring system 200.

The number of columns for each base receiver ID that indicate the percentage of shared messages is determined by the number of links (provided in column 360) that a particular base receiver 130 developed with other base receivers in the network 100. For example, if base receiver ID 60349 shared at least one message with each of the twelve other base receivers, then a column would be added for each base receiver in which base receiver 60349 had at least one shared message and these columns would each respectively provide the percentage of shared messages with that receiver, the number of miles of separation between the receivers and the angle of orientation from one receiver to the other. It will be appreciated that other columns may be added to the report 300. For example, a column indicating the percentage of unique messages received by each base receiver 130 may be added by dividing the number of unique messages by the total number of messages received for each base receiver 130.

With the information provided in the report 300, a network operator may determine which areas of the radio communication network 100 may be sufficient in radio coverage, deficient in coverage and in need of an additional base receiver 130, or areas where there may be redundant coverage and a base receiver 130 may be decommissioned. According to one embodiment, a network operator may determine that there is a redundant base receiver 130 in the network 100 if any one base receiver 130 has fewer than five unique messages per day and if it shares 90 percent of its traffic with any two other base receivers 130 in the network 100, where the base receiver 130 having the lowest number of unique messages may be decommissioned as a result of over-redundancy in coverage. In an alternative embodiment, any base receiver 130 having fewer than five unique messages per day and sharing 75 percent of its traffic with any three other base receivers 130 may be decommissioned. Or, any base receiver 130 that has fewer than five unique messages per day and shares 50 percent of its traffic with any four other base receivers 130 may also be decommissioned. It will be appreciated, however, that the specific criteria used for determining whether or not a base receiver 130 may be decommissioned from the network 100 may vary from one network operator to another, and, thus, need not be limited to the aforementioned examples.

A network operator may also determine if a base receiver 130 needs to be added to the radio communication network 100 because there is deficient coverage within a particular area. For example, if for any one base receiver 130 having a number of unique messages that is within 90 percent of its total messages received, then it would indicate an area of deficient radio coverage and the network operator may decide to add a base receiver 130 in that area. Of course, it will be appreciated that the network operator may set a percentage other than ninety percent unique-to-total messages received ratio to determine the area as having deficient radio coverage.

Figure 4:
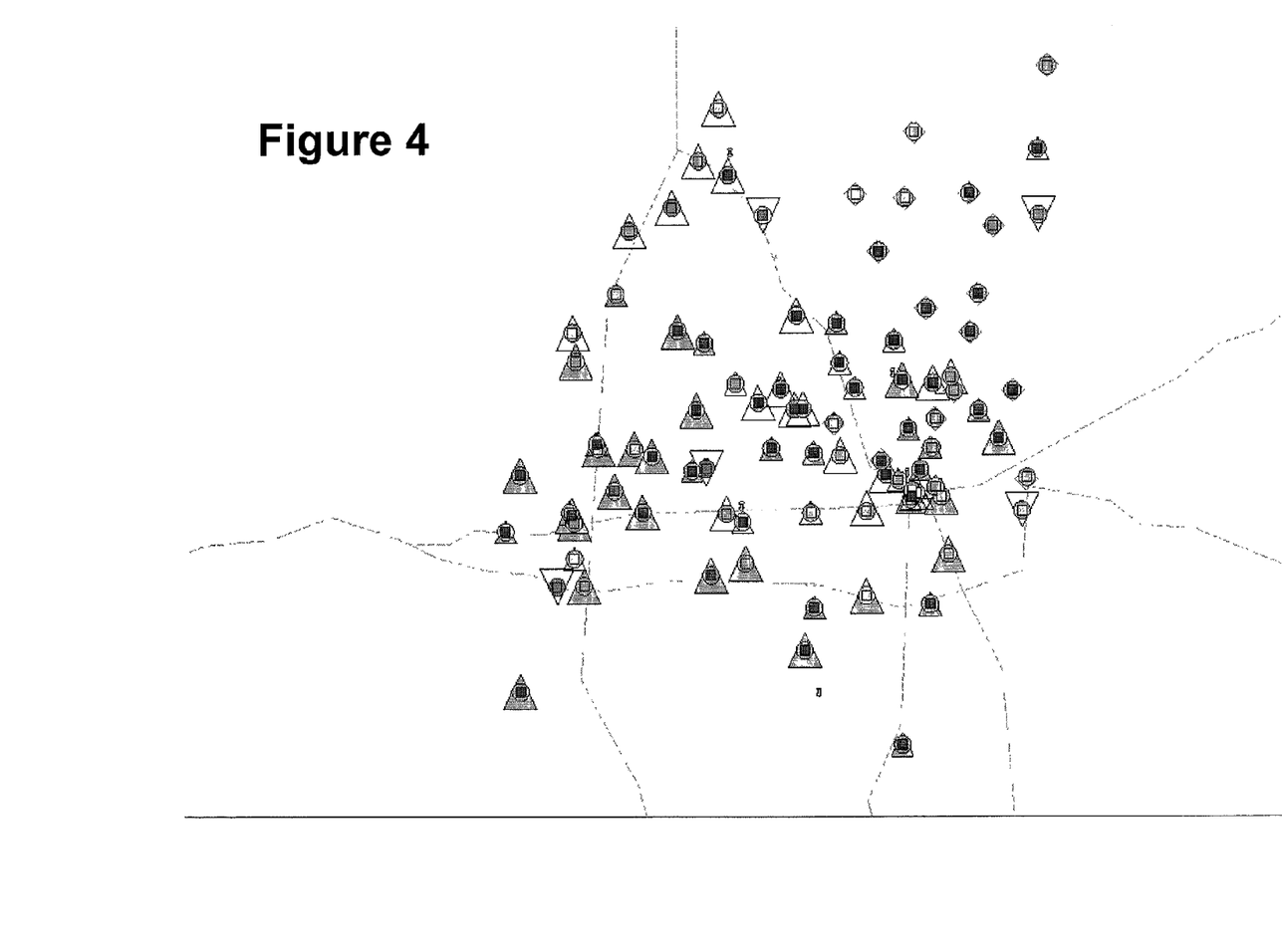
FIG. 4 is an example of an output provided by the network monitoring system of FIG. 2 that conveys radio coverage data in a graphical format.

In addition to providing the network coverage data in a spreadsheet format as shown in report 300, the network monitoring system 200 can also display the data in a symbolic format as shown in FIG. 4. In this particular embodiment, the base receivers 130 may be plotted on a map and various symbols and/or colors may be used to indicate areas of sufficient, deficient or redundant radio coverage in the communication network 100. The network operator can set various thresholds to the network data provided in table 300 and colors and/or symbols of his or her choice to indicate that such thresholds have or have not been exceeded. For example, to indicate on the map an area of deficient radio coverage in the network 100, the network operator may assign a threshold of 90 percent or higher for the unique-to-total messages received ratio for any base receiver 130 and have the icon representing the base receiver colored in red. Accordingly, for any base receiver 130 having its unique messages being 90 percent or higher of its total messages received, the network monitoring system 200 would have the base receiver shaded over in red to indicate an area of deficient radio coverage on the display 240.

Figure 5:
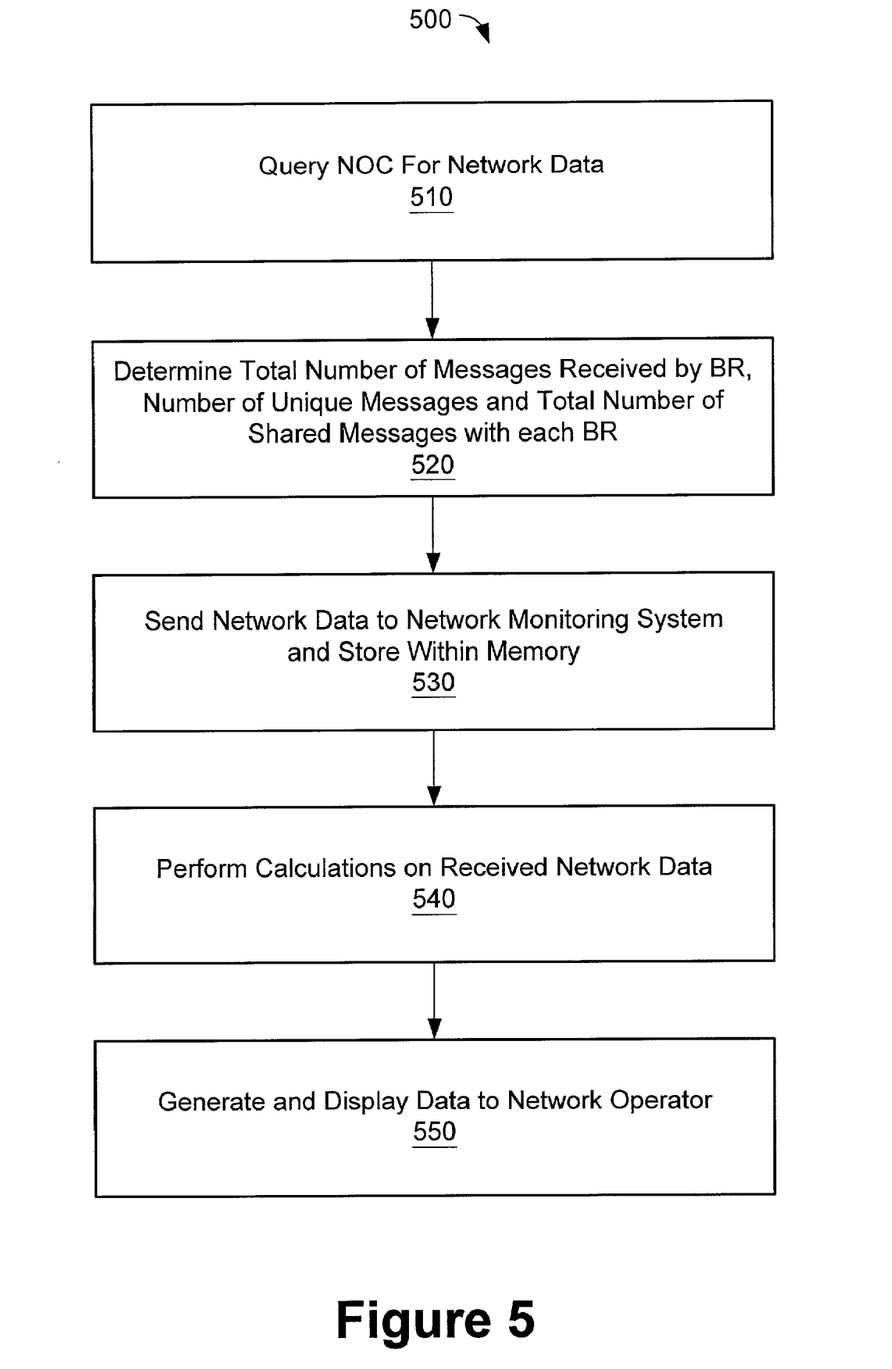
FIG. 5 shows a process for obtaining data related to the radio coverage of the communication network of FIG. 1 and generating a report for visual display to a network operator for optimizing radio coverage of the network.

Turning now to FIG. 5, a process 500 for providing data related to the performance of the radio communication network 100 is provided. The process 500 commences at block 510 where the network monitoring system 200 queries the NOC 140 for data related to the radio coverage of the network 100. The NOC 140, in response to the query, determines the total number of messages received for each base receiver 130 in the network 100, the number of unique messages received at each base receiver 130 and the number of shared messages with each other base receiver 130 for a specified period of time. In accordance with one embodiment, the specified period of time is a 168-hour period (i.e., a seven day period). It will be appreciated, however, that such specified period of time may be longer or shorter without departing from the spirit and scope of the present invention.

At block 530, the NOC 140 sends the network data to the network monitoring system 200, which compiles the received data 230 from the NOC 140, as well as other NOCs (not shown) within the network 100 and stores the data locally within memory 230.

At block 540, the network monitoring system 200 performs calculations on the received data from the NOC 140. Such calculations include determining the percentage of shared messages between one base receiver 130 and each other base receiver within the network 100 with which it shared a message, the percentage of unique-to-total messages received by a particular base receiver 130, etc. The network monitoring system 200 may also compare the network performance data to thresholds set by the network operator. For example, the network operator may set a threshold of 90 percent for a unique-to-total number of messages ratio for a base receiver to be deemed as providing deficient radio coverage for a particular area of the radio communication network 100. At block 550, the network monitoring system 200 generates the data in either a spreadsheet format (as shown in FIG. 3) or a graphical format (as shown in FIG. 4) for presentation to the network operator on the display 240.

With the use of the network monitoring system 200, areas of sufficient, deficient or redundant radio coverage can be readily identified and can be rectified to provide a more uniform and efficient radio communication network.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for optimizing radio coverage in a radio communication network, the radio communication network including a plurality of base station receivers coupled to a switch for communication with at least one mobile station, the method comprising:
   querying the switch for data related to the radio coverage provided by the communication network;
   sending the data to a monitoring device; and
   generating and displaying a report related to the data received by the switch, the report indicating areas of the communication network providing sufficient, deficient or redundant radio coverage in the communication network.

2. The method of claim 1, wherein sending the data to a monitoring device further comprises:
   determining a total number of messages received for each of the base station receivers in the communication network for a specified period of time; and
   sending the total number of messages received for said each of the base station receivers to the monitoring device.

3. The method of claim 2, wherein sending the data to a monitoring device further comprises:
   determining a total number of unique messages received for said each of the base station receivers for the specified period of time, each of the unique messages indicating a message received by only a respective one of the base station receivers; and
   sending the total number of unique messages received for said each of the base station receivers to the monitoring device.

4. The method of claim 3, wherein the sending the data to a monitoring device further comprises:
   determining a total number of shared messages received for said each of the base station receivers for the specified period of time, the shared messages indicating those messages that were also received by another of the base station receivers; and
   sending the total number of shared messages received for said each of the base station receivers to the monitoring device.

5. The method of claim 4, further comprising:
   calculating a percentage of shared messages between each one of the base station receivers and each of other ones of the base station receivers of the communication network, the percentage of shared messages being the total number of shared messages for said each of the base station receivers divided by the total number of messages received.

6. The method of claim 4, further comprising:
   calculating a percentage of unique messages for said each of the base station receivers of the communication network, the percentage of unique messages being the total number of unique messages for said each of the base station receivers divided by the total number of messages received for each respective one of the base station receivers.

7. The method of claim 5, wherein the generating and displaying a report related to the data received by the switch further comprises:
   generating a report conveying the calculated percentage of the shared messages between one of the base station receivers and each of the other ones of the base station receivers of the communication network.

8. The method of claim 6, wherein the generating and displaying a report related to the data received by the switch further comprises:
  generating a report conveying the percentage of unique messages calculated for said each of the base station receivers of the communication network.

9. The method of claim 6, further comprising:
  establishing a threshold value related to the percentage of unique messages for said each of the base station receivers of the communication network;
  determining whether the established threshold value has been exceeded by the percentage of unique messages for each of the base station receivers; and
  providing a visual indication providing that the established threshold value has been exceeded.

10. A system, comprising:
  a plurality of base station receivers configured to communicate via radio with at least one mobile station;
  a switch that is configured to couple the base station receivers; and
  a monitoring device that is configured to query the switch for data related to radio coverage provided by the base station receivers and to generate and to display a report related to the data received by the switch, the report indicating areas of the system providing sufficient, deficient or redundant radio coverage by the base station receivers.

11. The system of claim 10, wherein the switch is further configured to determine a total number of messages received for each of the base station receivers for a specified period of time and to send the total number of messages received for said each of the base station receivers to the monitoring device.

12. The system of claim 11, wherein the switch is further configured to determine a total number of unique messages received for said each of the base station receivers for the specified period of time, the unique messages indicating a message received by only a respective one of the base station receivers, and to send the total number of unique messages received for said each of the base station receivers to the monitoring device.

13. The system of claim 12, wherein the switch is further configured to determine a total number of shared messages received for said each of the base station receivers for the specified period of time, the shared messages indicating those messages that were also received by another one of the base station receivers, and is configured to send the total number of shared messages received for said each of the base station receivers to the monitoring device.

14. The system of claim 13, wherein the monitoring device is further configured to calculate a percentage of shared messages between each respective one of the base station receivers and others of the base station receivers, the percentage of shared messages being the total number of shared messages for said each of the base station receivers divided by the total number of messages received.

15. The system of claim 13, wherein the monitoring device is further configured to calculate a percentage of unique messages for said each of the base station receivers of the communication network, the percentage of unique messages being the total number of unique messages for said each of the base station receivers divided by the total number of messages received for said each of the base station receivers.

16. The system of claim 14, wherein the monitoring device is further configured to generate a report conveying the calculated percentage of the shared messages between respective ones of the base station receivers and another of the base station receivers.

17. The system of claim 15, wherein the monitoring device is further configured to generate a report conveying the percentage of unique messages calculated for said each of the base station receivers of the communication network.

18. The system of claim 15, wherein the monitoring device is further configured to determine whether an established threshold value has been exceeded by the percentage of unique messages for said each of the base station receivers and to provide a visual indication providing that the established threshold value has been exceeded.

19. The method of claim 1, wherein the generating and displaying comprises:
  displaying the report in a symbolic form.

20. The method of claim 19, wherein the generating and displaying further comprises:
  displaying a representation of each of the base station receivers on a map.

21. The method of claim 20, wherein the displaying the representation comprises:
  displaying each of the representations on the map as one of a plurality of symbols, each of the symbols indicating an area of one of sufficient radio coverage in the communication network, deficient radio coverage in the communication network and redundant radio coverage in the communication network.

22. The method of claim 20, wherein the displaying the representation comprises:
  displaying each of the representations on the map using one of a plurality of colors, each of the colors indicating an area of one of sufficient radio coverage in the communication network, deficient radio coverage in the communication network and redundant radio coverage in the communication network.

23. The system of claim 10, wherein the monitoring device is further configured to generate and display the report in a symbolic form.

24. The system of claim 23, wherein the monitoring device is further configured to generate and display the report including a representation of each of the base receivers on a map.

25. The system of claim 24, wherein each of the representations are to be displayed on the map as one of a plurality of symbols, each of the symbols indicating an area of one of sufficient radio coverage in the communication network, deficient radio coverage in the communication network and redundant radio coverage in the communication network.

26. The system of claim 24, wherein each of the representations are to be displayed on the map using one of a plurality of colors, each of the colors indicating an area of one of sufficient radio coverage in the communication network, deficient radio coverage in the communication network and redundant radio coverage in the communication network.

* * * * *